(12) United States Patent
Zimmer

(10) Patent No.: US 6,430,117 B2
(45) Date of Patent: Aug. 6, 2002

(54) METHOD FOR OPERATING A JUKEBOX

(75) Inventor: Manfred Zimmer, Bingen (DE)

(73) Assignee: NSM Music GmbH, Bingen (DE)

( * ) Notice: Subject to any disclaimer, the term of this patent is extended or adjusted under 35 U.S.C. 154(b) by 0 days.

(21) Appl. No.: 09/761,861

(22) Filed: Jan. 18, 2001

(30) Foreign Application Priority Data

Jan. 18, 2000 (DE) .......................................... 100 02 065
Apr. 8, 2000 (DE) .......................................... 100 17 593

(51) Int. Cl.[7] ............................................. G11B 17/22
(52) U.S. Cl. ................................................. 369/30.06
(58) Field of Search .......................... 369/30.06, 30.07, 369/30.08, 30.09, 30.28, 30.04, 30.3, 53.1, 53.21; 707/104.1; 360/73.03; 711/100, 111; 710/1

(56) References Cited

U.S. PATENT DOCUMENTS 5,331,614 A * 7/1994 Ogawa et al. ............ 369/30.03
5,467,326 A * 11/1995 Miyashita et al. ....... 369/30.06
5,644,558 A * 7/1997 Inatani et al. ............ 369/30.06
5,867,457 A * 2/1999 Parvulescu et al. ...... 369/30.06

* cited by examiner

Primary Examiner—Ali Neyzari
(74) Attorney, Agent, or Firm—Venable; Norman N. Kunitz

(57) ABSTRACT

A method for operating a jukebox having a disc changer (2) for discs (3) containing a plurality of music titles, particularly CDs, at least one disc magazine (6), at least one playback unit (7), a computer-controlled disc-transport device (8), and a display device (9) for displaying the music titles of the discs (3), with an associated address (12) that encompasses a respective disc address (10) and a title address (21), wherein the music titles of a disc (3) are displayed together and selected through keystrokes. To improve the selection of music titles, individual music titles of different discs (3) are combined into a group (18), assigned a new target address (19) that encompasses a group address (20) and a title address (21), and displayed together as a group (18) in the display device (9). Depending on the programming, the groups (18) can expand or limit the title selection.

10 Claims, 4 Drawing Sheets

METHOD FOR OPERATING A JUKEBOX

CROSS REFERENCE TO RELATED APLICATION

This application claims the priority of German patent Application No. 100 02 065.8 filed Jan. 18, 2000, which is incorporated herein by reference.

BACKGROUND OF THE INVENTION

The invention relates to a method for operating a jukebox having
- a disc changer for discs containing a plurality of music titles, particularly CDs,
- at least one disc magazine,
- at least one playback unit,
- a computer-controlled disc-transport device, and
- a display device for displaying the music titles of the discs, with an associated address that encompasses a respective disc address and a title address, with the music titles of a disc being displayed together and selected through keystrokes.

Jukeboxes offer the user a large number of music selections, typically in the order of magnitude of several hundred individual musical compositions; currently, a single compact disc (CD) can store more than, for example, 20 musical compositions. A program manager embodied as a display device usually offers the selection options; the user deposits a specified amount of money into the jukebox, then chooses one or more desired musical selections and uses a keypad to enter the corresponding identification of the selection(s) into the selection system of the jukebox, thereby initiating the playing process.

The discs housed in the jukebox are stored in a disc magazine that has a plurality of superposed compartments, with one disc holder that holds a respective disc being allocated a compartment. After a desired music title has been selected, the corresponding disc is retrieved, with the disc holder, from the disc magazine and transported by a computer-controlled transport device to a drive for playing the music title. Afterward, the transport device transports the disc and the disc holder back into the corresponding compartment of the disc magazine. Often, such devices have a plurality of disc magazines, which are typically exchangeable, so the transport device conveys the discs between numerous disc magazines. WO 93/11535 discloses a disc-playback device of this type, the device having two oppositely-located disc magazines in a housing.

DE-C-23 07 309 discloses a jukebox display device that includes a plurality of superposed, parallel, polygonal drums that rotate about axial shaft ends and have a plurality of essentially planar viewing surfaces with retaining elements for holding a strip card provided with a visually-readable display. The polygonal drums are coupled to a drive device; when this device is actuated, all of the polygonal drums are rotated simultaneously by the same angular path, so a different viewing surface of each polygonal drum is rotated into the viewing position. To expand the program selection, numerous such display devices can be disposed adjacently. This solution only allows the program selection to be increased to a certain extent, however, because the space requirement for polygonal drums containing, for example, more than one thousand music titles becomes excessive.

DE-A-40 01 785 discloses a display device, particularly for music titles, in a jukebox. Here, two adjacent stacks of information carriers are disposed vertically one behind the other in a frame housing; their front side is embodied as a display surface. The two stacks travel stepwise and synchronously toward one another, offset by an interval equal to the thickness of an information carrier.

Hence, a relatively large viewing surface, on the one hand, and a relatively large amount of space for the disc magazines and the display device, on the other hand, are required for displaying and playing a large selection of music titles. Furthermore, of the available musical compositions, only a few are frequently requested by the circle of users, and they must be searched for among the multitude of available selections. This search is often time-consuming, because the music titles of no more than two discs can be displayed simultaneously on each display surface of the display device, even if a disc includes only a few titles.

SUMMARY OF THE INVENTION

It is the object of the invention to provide a method for operating a jukebox of the type mentioned at the outset, with which a large, varied selection of music titles can be presented in an inexpensive, compact embodiment.

In accordance with the invention, this object is accomplished in that individual music titles of various discs are combined into a group, assigned a new target address that encompasses a group address and a title address, and displayed together in the display device.

Combining the group with individual music titles of physically present discs allows for a highly-variable jukebox selection, because the display in the display device is not limited to the music titles of real discs, but is expanded by the group displayed as a separate disc. Here, the number of groups and group addresses can be freely selected. If the number of groups is larger than the number of discs, they expand the title selection. If the number of groups is smaller than the number of discs, the group replaces the corresponding disc with the same address. Numerous different groups can be created, such as groupings of frequently-selected country, rock, classical and pop hits. Consequently, the jukebox is relatively simple to operate, because the user must no longer search for these hits among the many available music titles, but is presented with them as a group in a common display. The common group address creates the impression that this group is an existing compact disc.

It is also possible for the display device not to display all of the music titles of the available discs, but only the released music titles. The unreleased music titles, so-called filler titles, are disregarded in the grouping process and are therefore not displayed, so the display device is relatively inexpensive to produce. A specific title address can also allow the music titles of an entire disc to be incorporated as a single music title into a group, so the entire disc can be played when this title address is selected. This option is particularly advantageous for extended playing of background music that is likewise assigned its own group. The groups can be created by, for example, a jukebox manufacturer based on the jukebox setup. Corresponding to the jukebox programming, of course, the number of information carriers displayed in the display device can be larger or smaller than the number of discs.

The jukebox computer advantageously creates a link between the address of the disc music title and the target address. These links are created with a relatively small amount of calculation, so a number of addresses of physically present music titles can be linked with corresponding stored target addresses, even with a severely-limited computer capacity.

To assure rapid access to the desired music titles with relatively simple memory management, each group is preferably displayed as a virtual disc and stored in a computer memory.

For simply exchanging the groups, each group of music titles is advantageously stored in a separate file. It is also possible to store all groups of music titles in a common file. In this instance, the file can have, for example, a database structure that utilizes preset search and sort commands to assure the relatively simple creation of a new group from existing groups.

The file is preferably stored in a physical storage medium of the computer. The physical storage medium, such as a hard disk, a flash PROM, a battery-buffered RAM or the like, guarantees reliability in the archiving of the stored file.

The file is advantageously programmed in the jukebox itself, or programmed on an external computer and transmitted to the jukebox computer by way of a network connection or a data remote transfer. While programming in the jukebox is effected without additional devices, programming on an external computer offers the convenience of transmitting a file that has been created one time to the computers of several jukeboxes by way of the network connection or remote data transmission. Moreover, auxiliary programs can be installed onto an external computer for facilitating file programming.

In a conventional embodiment of the display device, information carriers that correspond in number to the number of discs and groups can be used to display the music titles. Thus, the jukebox user can directly access the entire selection; it is necessary here to create special information carriers for the groups.

A monitor that is coupled to the computer is preferably used to display the music titles. This assures an individual display of the music titles; all of the music titles of the discs and groups can be displayed, or only the music titles of the groups can be displayed. After the groups are changed, the display of the group music titles also changes automatically.

According to an advantageous embodiment of the invention, the computer controls the display of the groups. The display and/or selection of certain groups can be enabled or blocked by the association of specific attributes. This can be effected, for example, with defined time windows as a function of the days of the week. It is therefore possible to enable or block background sounds, animation sounds and/or advertisements.

Of course, the features mentioned above and described in detail below can be used not only in the given combination, but in other combinations as well, within the spirit of the present invention.

The invention is described in detail below by way of an exemplary embodiment, with reference to the attached drawings.

DETAILED DESCRIPTION OF THE PREFERRED EMBODIMENTS

Figure 1:
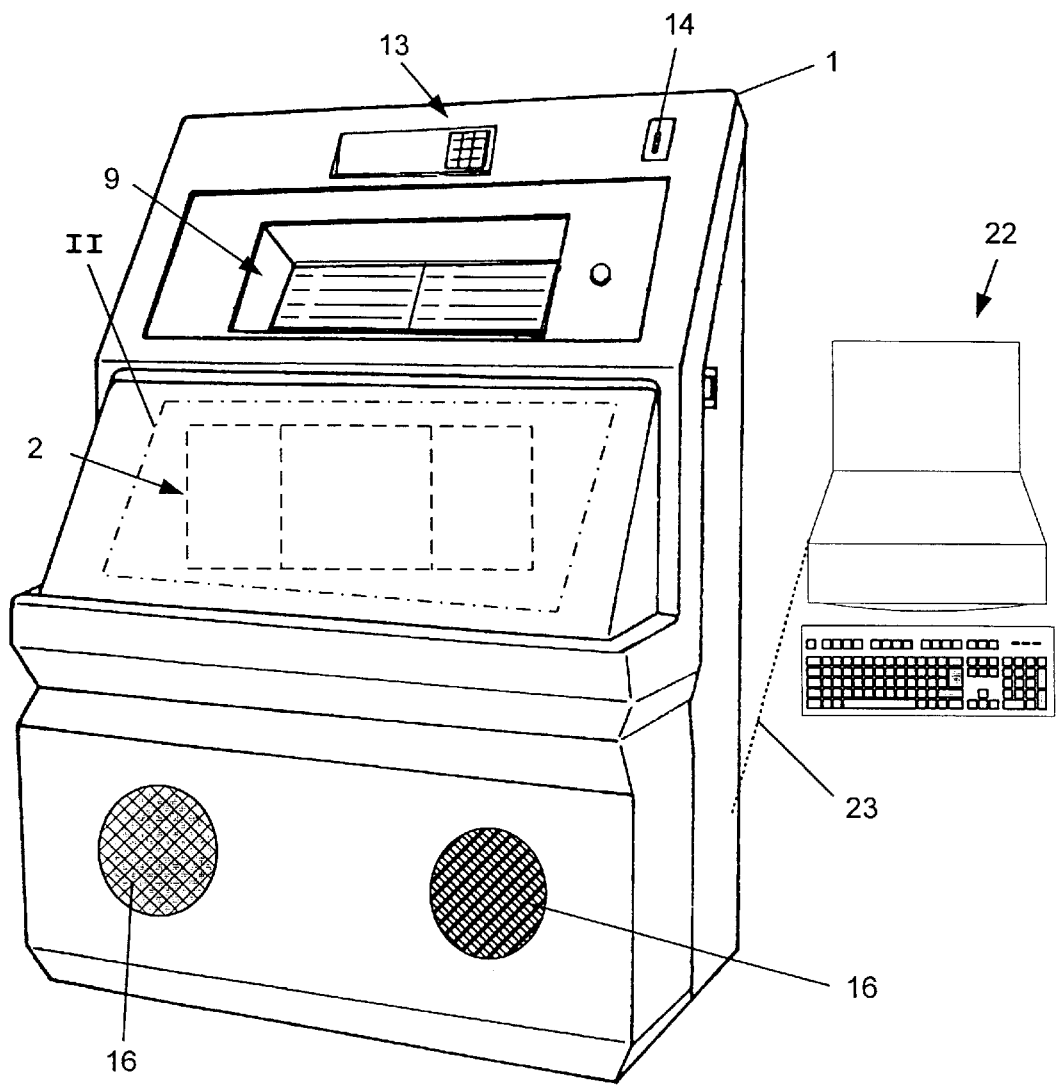
FIG. 1 is a jukebox that is operated in accordance with the method of the invention.
Figure 2:
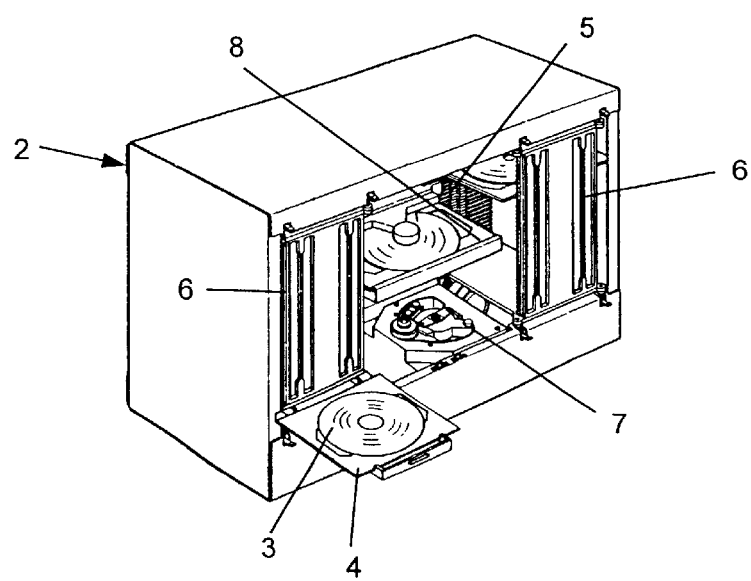
FIG. 2 is a representation of the detail II from FIG. 1.
Figure 3:
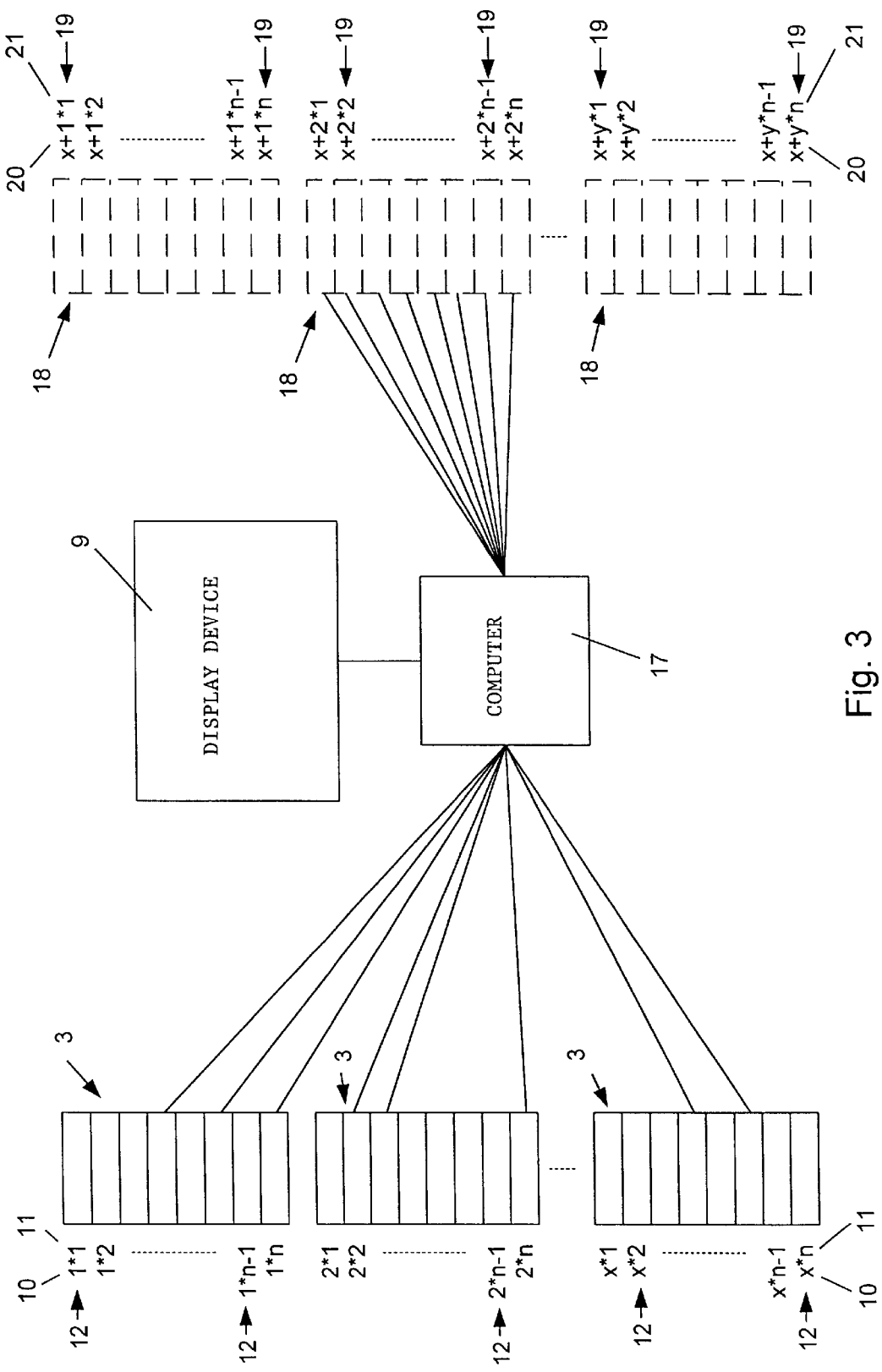
FIG. 3 is a schematic representation of the method of the invention.
Figure 4:
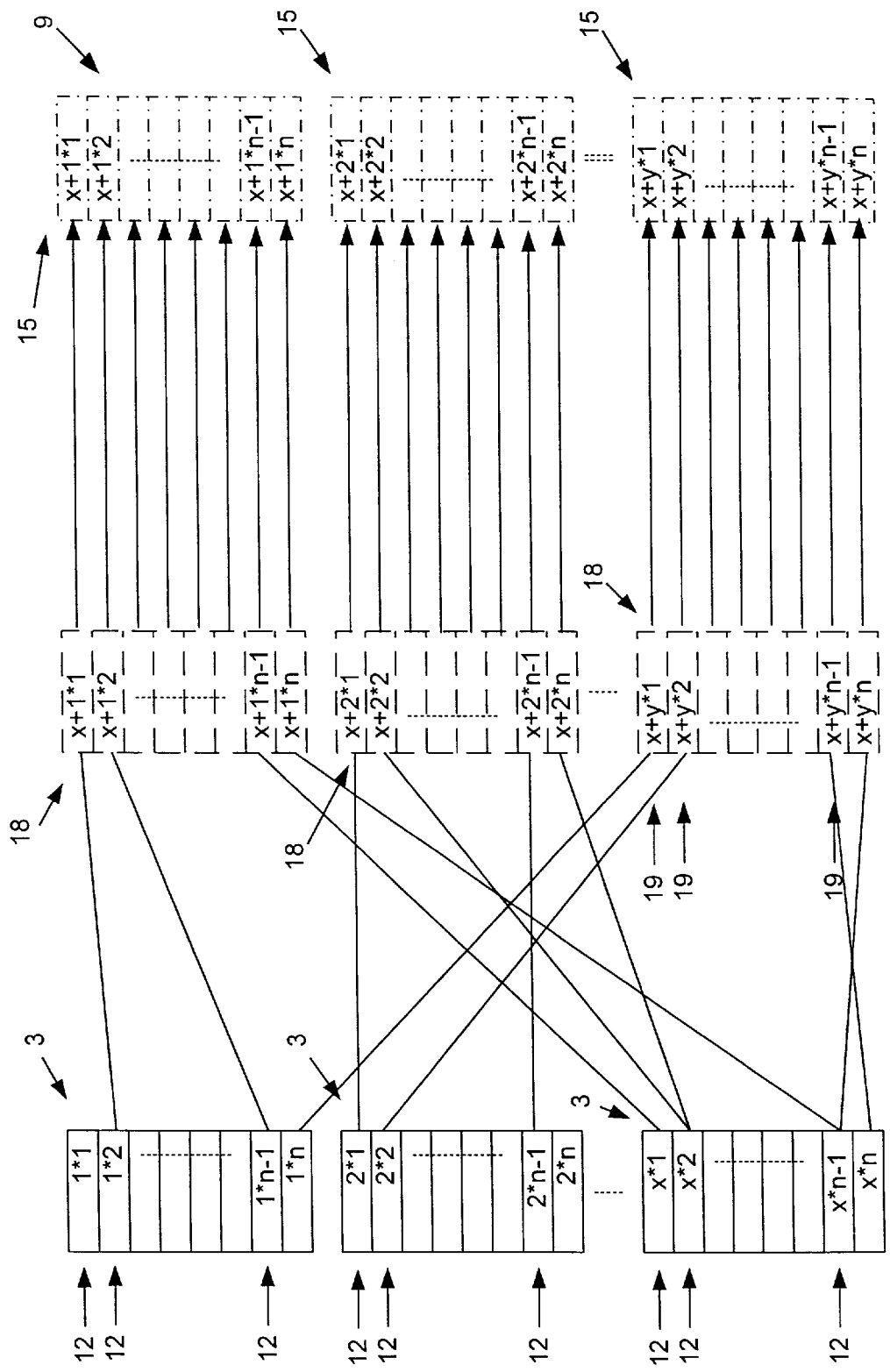
FIG. 4 is a further schematic representation according to FIG. 1.
Figure 5:
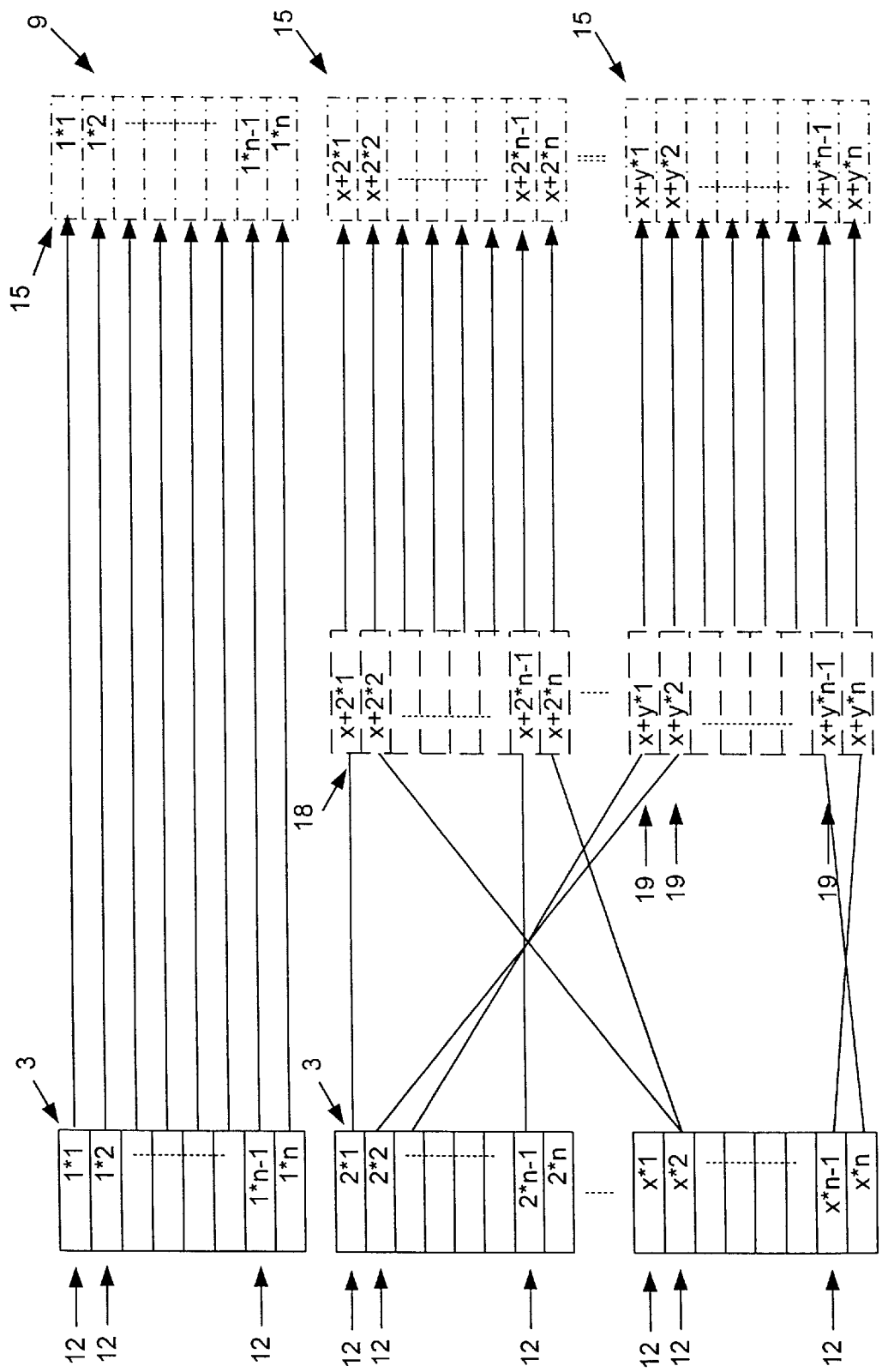
FIG. 5 is an alternative schematic representation according to FIG. 3.

A jukebox 1 includes a disc changer 2 for discs 3 containing a plurality of music titles, with the discs 3 being respectively stored in disc holders 4 in compartments 5 of oppositely-located disc magazines 6. A playback unit 7 with an associated transport device 8 is disposed between the disc magazines 6. The music titles 15 of the discs 3 are displayed in a display unit 9; the music titles 15 of one disc 3 are displayed together, and selected through a corresponding entry of an address 12, which encompasses a disc address 10 and a title address 11, by way of a keypad 13. Before a music title 15 is played, it is necessary to insert a certain amount of money through a coin-deposit slot 14 of a money-processing device, not shown. Loudspeakers 16 for reproducing the music titles are further associated with the jukebox 1.

After the address 12 of the desired music title 15 has been entered, and a sufficient amount of money has been deposited, the disc-transport device 8, controlled by a computer 17 of the jukebox 1, travels to the address 12 of the corresponding disc 3 and brings it to the playback unit 7, which plays the music title 15 defined by the title address 11.

To offer a selection of music titles that extends beyond the physically present discs 3, individual music titles of the discs 3 are combined into a group 18. In this instance, a new target address 19, which encompasses a group address 20 and a title address 21, is assigned to each music title. The computer 17 of the jukebox 1 creates a link between the addresses 12 of the music titles of the discs 3 and the target addresses 19 of the groups 18. Each formed group 18 is displayed with the associated music titles in the display device 9, and appears to be a disc due to the unifying group address 20.

The group 18 with the group address "x+2" includes three music titles of the disc 3 with the disc address "1," three music titles of the disc 3 with the disc address "2" and two music titles of the disc 3 with the disc address "x," which present the user of the jukebox 1 with a viewable selection of a music category that is displayed in the display device 9 and selected through a corresponding entry of the target address 19 with the keypad 13. Once the corresponding music titles of the group 18 have been selected, the disc-transport device 8 travels to the address 12 of the disc 3 linked to the target address 19, and brings this disc from the disc magazine 6 to the playback unit 7, which plays the corresponding music title whose title addresses 11, 20 are linked by the computer 17. The individual groups 18 are stored as separate files in the computer 17. A plurality of information carriers 15 is provided in the display device 9 for displaying the target addresses 19 that are linked with the music titles, and correspond in number to the groups 18; the number of information carriers 15 and groups 18 can be smaller than the number of discs 3.

It is likewise possible to display target addresses 19 of the groups 18, and addresses 12 of the discs 3, on information carriers 15 of the display device 9, in which case the target addresses 19 and addresses 12 are respectively linked with music titles.

The input or programming of the groups 18 with music titles from different discs 3 is effected on an external computer 22, on which the corresponding files are stored and transmitted through data remote transfer to the computer 17 of the jukebox 1 via a telephone line 23.

The invention now being fully described, it will be apparent to one of ordinary skill in the art that many changes and modifications can be made thereto without departing from the spirit or scope of the invention as set forth herein.

We claim:

1. A method for operating a jukebox having
   a disc changer (2) for disks (3) containing a plurality of music titles
   at least one disk magazine (6),
   at least one playback unit (7),
   a computer-controlled disc-transport device (8), and
   a display device (9) for displaying the music titles of the disks (3), with an associated address (12) that includes a respective disk address (10) and a title address (21), with the music titles of a disk (3) being displayed together and selected through keystrokes,
and wherein individual music titles of different disk discs (3) are combined into a group (18), are assigned a new target address (19) that encompasses a group address (20) and the respective title address (21), and displayed together as the group (18) in the display device (9).

2. The method according to claim 1, wherein the computer (17) of the jukebox (1) creates a link between the address (12) of the music title of the disc (3) and the target address (19).

3. The method according to claim 1, wherein each group (18) is displayed as a virtual disc, and is stored in a memory of the computer (17).

4. The method according to claim 1, wherein each group (18) of music titles is stored in a separate file.

5. The method according to claim 1, wherein all groups (18) of music titles are stored in a common file.

6. The method according to claim 5, wherein the file is stored in a physical storage medium of the computer (17).

7. The method according to claim 1, wherein the file is programmed in the jukebox (1) itself, or programmed on an external computer (22) and transmitted to the computer (17) of the jukebox (1) by way of a network connection or a data remote transfer.

8. The method according to one of claim 1, wherein information carriers that correspond in number to the discs (3) and the groups (18) are used to display the music titles.

9. The method according to claim 1, wherein a monitor that is coupled to the computer (17) is used to display the music titles.

10. The method according to claim 1, wherein the computer controls the availability of the groups (18).

* * * * *